US012749784B2

(12) United States Patent
Wang et al.

(10) Patent No.: US 12,749,784 B2

(45) Date of Patent: Sep. 29, 2026

(54) BATTERY, METHOD FOR MANUFACTURING BATTERY, AND POWER CONSUMING DEVICE

(71) Applicant: CONTEMPORARY AMPEREX TECHNOLOGY (HONG KONG) LIMITED, Hong Kong (CN)

(72) Inventors: Zhi Wang, Ningde (CN); Feng Qin, Ningde (CN); Zhanyu Sun, Ningde (CN); Peng Wang, Ningde (CN); Hongye Ji, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 707 days.

(21) Appl. No.: 18/120,239

(22) Filed: Mar. 10, 2023

(65) Prior Publication Data

US 2023/0238674 A1 Jul. 27, 2023

Related U.S. Application Data

(63) Continuation of application No. PCT/CN2021/112642, filed on Aug. 14, 2021.

(51) Int. Cl.

*H01M 50/636* (2021.01)
*H01M 10/04* (2006.01)

(Continued)

(52) U.S. Cl.

CPC ..... *H01M 50/636* (2021.01); *H01M 10/0422* (2013.01); *H01M 50/548* (2021.01); *H01M 50/566* (2021.01); *H01M 2220/20* (2013.01)

(58) Field of Classification Search

CPC ..... H01M 50/107; H01M 50/213–249; H01M 10/0422; H01M 10/04; H01M 10/0525;

(Continued)

(56) References Cited

U.S. PATENT DOCUMENTS 6,340,877 B1 1/2002 Mita et al.
2008/0166630 A1* 7/2008 Okabe .................... H01M 2/30 429/178

FOREIGN PATENT DOCUMENTS

CN 204834764 U 12/2015
CN 107507707 A 12/2017

(Continued)

OTHER PUBLICATIONS

Sakatani, JP-2016012393-A EPO machine translation, 2016 (Year: 2016).*

(Continued)

*Primary Examiner* — Haroon S. Sheikh
*Assistant Examiner* — Kan Luo
(74) *Attorney, Agent, or Firm* — K&L Gates LLP

(57) ABSTRACT

The present application relates to a battery, a method for manufacturing a battery, and a power consuming device. The battery includes at least two battery cells, wherein each of the battery cells includes electrode terminals arranged at end portions of two sides of the battery cell in a lengthwise direction, wherein a filling port for filling an electrolyte is provided in the electrode terminal on one side in the lengthwise direction of the battery cell, and the electrode terminals of the two battery cells are oppositely arranged in the lengthwise direction of the battery cells and are welded together to seal the filling ports. According to the battery of the present application, the filling port is provided in the electrode terminal, and the filling port does not occupy a space of an end cap, such that the size of the electrode terminal may be increased, thereby increasing the overcurrent area of the electrode terminal. Moreover, the entire battery is sealed directly by means of the electrode terminals without an additional sealing procedure, thereby reducing the cost and improving the production efficiency.

15 Claims, 15 Drawing Sheets

(51) Int. Cl.
*H01M 50/548* (2021.01)
*H01M 50/566* (2021.01)

(58) Field of Classification Search
CPC . H01M 50/636; H01M 50/548; H01M 50/566
See application file for complete search history.

(56) References Cited

FOREIGN PATENT DOCUMENTS

| | | | | | |
|---|---|---|---|---|---|
| CN | 208284552 | U | | 12/2018 | |
| CN | 110518174 | A | | 11/2019 | |
| CN | 112072017 | A | | 12/2020 | |
| CN | 112993473 | A | | 6/2021 | |
| DE | 102006005532 | A1 | | 8/2007 | |
| EP | 1120841 | A1 | * | 6/2001 | .......... H01M 50/171 |
| JP | 2000149910 | A | | 5/2000 | |
| JP | 2000200597 | A | | 7/2000 | |
| JP | 2007242602 | A | | 9/2007 | |
| JP | 2012099746 | A | | 5/2012 | |
| JP | 2014183026 | A | | 9/2014 | |
| JP | 2016012393 | A | * | 1/2016 | .......... H01M 50/538 |
| KR | 1020020032095 | A | | 5/2002 | |

OTHER PUBLICATIONS

Contemporary Amperex Technology Co., Limtied, International Search Report and Written Opinion PCTCN2021112642, May 17, 2022, 14 pgs.

Notice of Preliminary Rejection (with English Machine Translation), mailed Jun. 17, 2025, for corresponding Korean Patent Application No. 10-2023-7011272.

Notice of Reasons for Refusal received in the corresponding Japanese Application 2023-519748, mailed on Jun. 3, 2024.

The extended European Search Report received in the corresponding European Application 21953632.3, mailed on Jun. 20, 2024.

The first Office Action (with English Machine Translation), mailed May 29, 2026, for corresponding Chinese Patent Application No. 202180085491.2.

* cited by examiner

BATTERY, METHOD FOR MANUFACTURING BATTERY, AND POWER CONSUMING DEVICE

CROSS-REFERENCE TO RELATED APPLICATION

This application is a continuation application of PCT Patent Application No. PCT/CN2021/112642, entitled "BATTERY, BATTERY MANUFACTURING METHOD AND ELECTRICAL DEVICE" filed on Aug. 14, 2021, which is incorporated herein by reference in its entirety.

TECHNICAL FIELD

The present application relates to the technical field of energy storage devices, and in particular to a battery, a method for manufacturing a battery, and a power consuming device.

BACKGROUND ART

Energy conservation and emission reduction are the key to the sustainable development of the automobile industry. In this case, electric vehicles have become an important part of the sustainable development of the automotive industry due to their advantages in energy conservation and environmental protection. For the electric vehicles, battery technology is an important factor in their development.

In a battery production process, it is necessary to fill an electrolyte into the battery cell. In the prior art, a filling port is provided in an end cap of the battery cell, and it is necessary to seal the filling port after the electrolyte is filled through the filling port, resulting in a complex process and high cost.

SUMMARY OF THE INVENTION

In order to solve the above problem, the present application provides a battery. A filling port of the battery does not occupy a space of an end cap, such that sufficient and flexible arrangements and arrangement spaces may be provided for other elements on the end cap with no influence the structural strength of the end cap, and no additional sealing procedure is required for the filling port, such that the production efficiency is high, and the cost is low.

A first aspect of an embodiment of the present application provides a battery. The battery includes at least two battery cells, wherein each of the battery cell includes electrode terminals arranged at end portions of two sides of the battery cell in a lengthwise direction, wherein a filling port for filling an electrolyte is provided in the electrode terminal on one side in the lengthwise direction of the battery cell, and the electrode terminals of the two battery cells are oppositely arranged in the lengthwise direction of the battery cells and are welded together to seal the filling ports.

The filling port is provided on the electrode terminal and does not occupy a space of an end cap, such that the arrangement of other elements may be facilitated. For example, the size of the electrode terminal may be increased, thereby increasing the overcurrent area of the electrode terminal. The two electrode terminals having the filling ports are oppositely arranged and welded together, the entire battery is sealed directly by means of the electrode terminals without an additional sealing procedure, thereby improving the production efficiency and reducing the cost.

In some embodiments, the filling ports are located in the center of the electrode terminals, so as to facilitate communication between the filling ports of the two battery cells.

The provision of the filling ports in the center of the electrode terminals allows the influence of the welding of the electrode terminals on the filling ports to be avoided, and facilitates the communication between two filling ports when the two electrode terminals abut against each other for supplement and balance of the electrolyte between the two battery cells.

In some embodiments, a groove is further provided on a side surface of the electrode terminal that has the filling port, and the size of the groove is greater than that of the filling port in a direction perpendicular to the lengthwise direction of the battery cell.

When the two electrode terminals having the filling ports are welded together, thanks to the buffer storage of the electrolyte in the groove, the risk of the electrolyte flowing out through the filling ports is reduced during welding, and the influence of the flowed-out electrolyte on the quality of a weld joint is avoided.

In some embodiments, the filling ports is offset from the center of the electrode terminals, so as to stagger the filling ports of the two battery cells.

When the two filling ports are arranged in a staggered manner, the two filling ports may be completely staggered without communication therebetween, and after the two electrode terminals are welded together, one filling port may be blocked by a portion of the other electrode terminal that has no filling port, such that the electrolyte in the two battery cells is prevented from circulating between the battery cells during use.

In some embodiments, a step portion is provided at the periphery of an end portion of the electrode terminal in the lengthwise direction of the battery cell, and the step portions of the two battery cells are oppositely arranged to form a welding groove.

The two electrode terminals are welded at the welding groove, and during welding, reflections of welding laser are concentrated in the welding groove, thereby improving the welding quality and enhancing the sealing performance of the battery.

In some embodiments, the filling port has a circular, square, triangular or polygonal cross section. The electrode terminals of the two battery cells are welded together, and no additional sealing pin is required for welding and sealing the filling ports. Therefore, the shapes of the filling ports are not limited by the path of laser welding, are not limited to a circular shape, such that the filling ports may be shaped more flexibly.

In some embodiments, the battery cells are cylindrical battery cells, and/or the electrode terminals are cylindrical electrode terminals.

A second aspect of an embodiment of the present application provides a method for manufacturing a battery. The battery includes at least two battery cells, wherein each of the battery cell includes electrode terminals arranged at end portions of two sides of the battery cell in a lengthwise direction. The method includes: providing a filling port for filling an electrolyte in the electrode terminal on one side in the lengthwise direction of the battery cell; filling the electrolyte into the battery cell through the filling port; and oppositely arranging the electrode terminals of the two battery cells that have the filling ports in the lengthwise direction of the battery cells and welding the electrode terminals together.

In some embodiments, the method for manufacturing a battery further includes the step of testing the battery for gas tightness in order to ensure that the battery has a good gas tightness.

In some embodiments, the method further includes, prior to the oppositely arranged the electrode terminals of the two battery cells that have the filling ports in the lengthwise direction of the battery cells and welding the electrode terminals together, the step of filling helium into the battery cells through the filling ports.

Helium is filled into the battery cells through the filling ports, then the electrode terminals of the two battery cells are welded together, and it is unnecessary to additionally provide an air tightness test hole and seal the test hole, thereby reducing battery manufacturing procedures and improving the production efficiency.

A third aspect of an embodiment of the present application provides a power consuming device, including the battery of the first aspect, or a battery manufactured by the method for manufacturing a battery of the second aspect, the battery being configured for providing electric energy.

It should be understood that the above general descriptions and the detailed description hereinafter are merely exemplary, and cannot limit the present application.

BRIEF DESCRIPTION OF THE DRAWINGS

To more clearly describe technical solutions of embodiments of the present application, the drawings to be used in the embodiments of the present application will be described briefly below. Obviously, the drawings in the following description are merely specific embodiments of the present application. For those skilled in the art, other embodiments may also be obtained according to the following drawings without any creative effort.

LIST OF REFERENCE SIGNS

Figure 1:
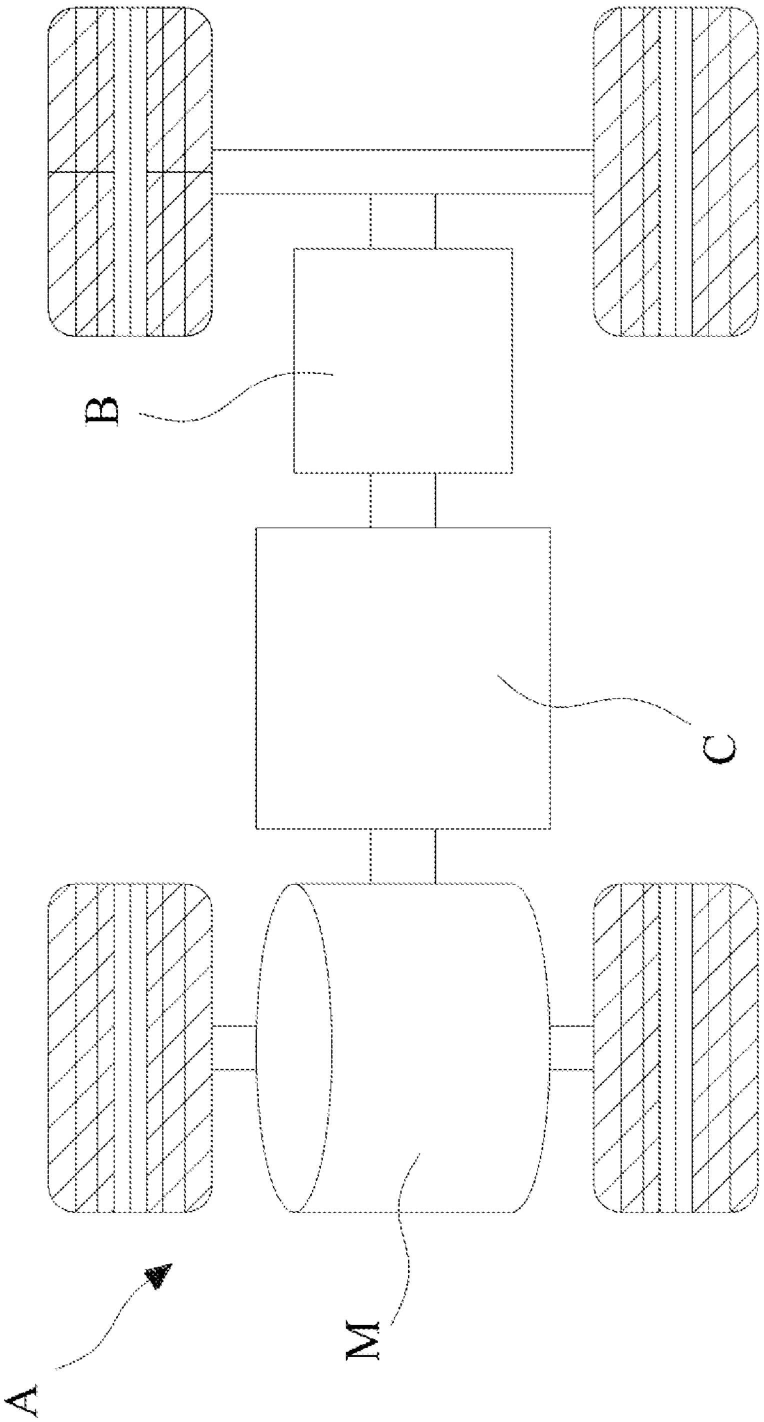
FIG. 1 is a schematic structural diagram of a power consuming device according to a particular embodiment of the present application.

A—vehicle;
B—battery;
C—controller;
M—motor;
100—battery cell;
1—end cap assembly;
11—electrode terminal;
111—filling port;
112—groove;
113—step portion;
114—welding groove;
12—end cap; and
2—housing.

The accompanying drawings herein are incorporated into the description and form a part of the description, illustrate the embodiments conforming to the present application, and are intended to explain principles of the present application together with the description.

DETAILED DESCRIPTION OF EMBODIMENTS

To better understand the technical solutions of the present application, embodiments of the present application will be described in detail below with reference to the accompanying drawings.

It should be clear that the embodiments described are merely some of, rather than all of, the embodiments of the present application. All other embodiments obtained by those of ordinary skill in the art based on the embodiments of the present application without any creative effort shall fall within the scope of protection of the present application.

The terms used in the embodiments of the present application are merely for the purpose of describing specific embodiments, but are not intended to limit the present application. The terms "a/an", "the" and "this" of singular forms used in the embodiments and the appended claims of the present application are also intended to include plural forms, unless otherwise specified in the context clearly.

It should be understood that the term "and/or" used herein is merely intended to describe an associated relation of associated objects, representing that three relations may exist, for example, A and/or B, may include: the three instances of A alone, A and B simultaneously, and B alone. In addition, the character "I" herein generally indicates an "or" relation between the associated objects.

It should be noted that the directional terms such as "above", "under", "left", and "right" described in the embodiments of the present application are described as seen from the angles shown in the accompanying drawings, and should not be understood as limitations to the embodiments of the present application. In addition, in the context, it should be further understood that when an element is referred to as being "above" or "under" another element, the element can not only be directly connected "above" or "under" another element, but also be indirectly connected "above" or "under" another element by means of an intermediate element.

A battery mentioned in an embodiment of the present application refers to a single physical module including one or more battery cells to provide higher voltage and capacity.

A battery cell includes an electrode assembly, a housing, an end cap assembly, and an electrolyte filled into the battery cell. The electrode assembly is arranged in the housing, and the end cap assembly is connected to the housing to enclose the electrode assembly in the housing. The end cap assembly includes an end cap and an electrode terminal arranged on the end cap, wherein the electrode assembly is electrically connected to the electrode terminal. A plurality of battery cells may be connected in series or in parallel or in series and parallel by means of the electrode terminals, and the series-parallel connection means a combination of serial connection and parallel connection.

The applicant has noted that a filling port for filling an electrolyte into the battery cell is usually arranged on the end cap, and since the filling port occupies a space of the end cap, the electrode terminal arranged on the end cap may not be made bigger, and overcurrent area of the electrode terminal is reduced accordingly. The filling port is provided in the end cap, which results in a reduction in the structural strength of the end cap, and an additional sealing procedure is required for the filling port.

In order to solve the above problem, a structure of a battery is improved, in which the filling port is provided in the electrode terminal such that the filling port does not occupy the space of the end cap and the electrode terminal may be made bigger, which increases the overcurrent area and has no influence on the structural strength of the end cap. Electrode terminals of two battery cells that have filling ports are oppositely arranged and welded together such that no additional sealing procedure is required for the filling ports, thereby improving the production efficiency and reducing the cost. The embodiments of the present application will be further described below.

FIG. 1 is a schematic structural diagram of a power consuming device according to a particular embodiment of the present application.

As shown in FIG. 1, the embodiment of the present application provides a battery B and a power consuming device using the battery B as a power supply. The power consuming device using the battery B as the power supply includes a vehicle A, a ship, a small aircraft, etc. The battery B is used to provide electric energy to the device, so as to generate a driving force for driving the device. The device may also use both electric energy and other types of energy (such as fossil energy) to jointly generate a driving force. Any device that may use the battery B as the power supply falls within the scope of protection of the present application.

As shown in FIG. 1, with the vehicle A as an example of the power consuming device, the vehicle A in the embodiment of the present application may be a new energy vehicle which may be a battery electric vehicle, a hybrid electric vehicle or an extended range electric vehicle, etc. The battery B is arranged inside the vehicle A, and the battery B may be arranged at the bottom, head or tail of the vehicle A. The battery B may be configured for supplying power to the vehicle A. For example, the battery B may be used as an operating power supply for the vehicle A. The vehicle A may further include a controller C and a motor M, and the controller C is configured for controlling the battery B to supply power to the motor, for example, to meet a working power demand during start, navigation, and driving of the vehicle.

In some embodiments of the present application, the battery B may not only serve as an operating power supply for the vehicle A, but also serve as a driving power supply for the vehicle A, instead of or partially instead of fuel or natural gas, to provide driving power for the vehicle A.

Figure 2:
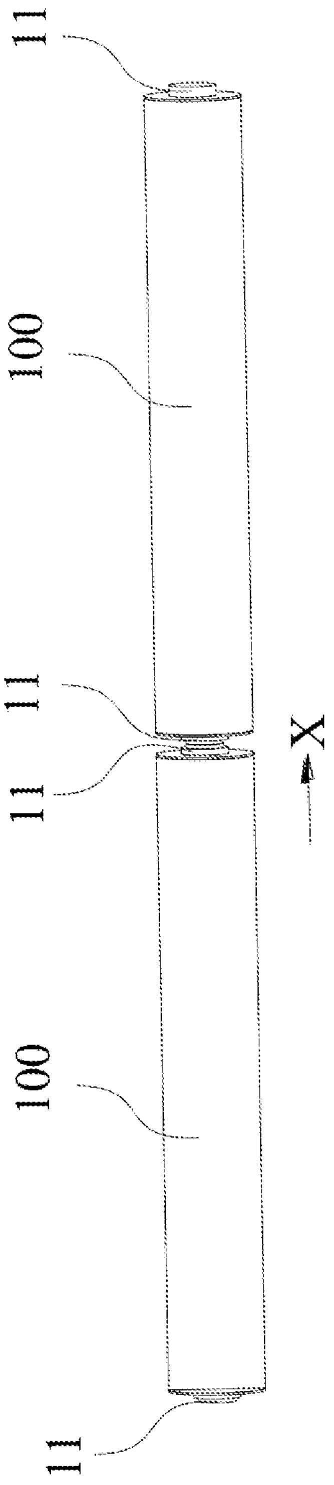
FIG. 2 is a schematic structural diagram of a battery according to some embodiments of the present application.

FIG. 2 is a schematic structural diagram of the battery B according to some embodiments of the present application.

As shown in FIG. 2, the battery B of some embodiments of the present application includes at least two battery cells 100, and electrode terminals 11 of two of the battery cells 100 are welded together. The electrode terminals 11 of the battery cell 100 include a positive terminal and a negative terminal which are arranged on two ends of the battery cell 100 in a lengthwise direction X respectively.

When the two battery cells 100 are welded together to form the battery B, the positive terminals of the two battery cells 100 may be oppositely arranged and welded, so as to connect the two battery cells 100 in parallel; or the negative terminals of the two battery cells 100 are oppositely arranged and welded together, so as to connect the two battery cells 100 in parallel; and it is also possible that the positive terminal of one battery cell 100 and the negative terminal of the other battery cell 100 are oppositely arranged and welded together, so as to connect the two battery cells 100 in series.

In some embodiments, in order to satisfy different power demands, the battery B may include a plurality of battery cells 100. Optionally, the electrode terminals 11 of the two battery cells 100 may be welded, and then the battery cells 100 welded in pairs are connected in parallel or in series or in series and parallel to form the battery B. The series-parallel connection means a combination of serial connection and parallel connection. Alternatively, the electrode terminals 11 of the two battery cells 100 may be welded together, and then one of electrode terminals 11 of the other battery cell 100 is welded to the electrode terminal 11 on an end of one battery cell 100 of the two battery cells 100 that have been welded together to form the battery B in which three battery cells 100 are welded along a straight line, or so on. The plurality of battery cells 100 are welded together along a straight line to form the battery B.

Figure 3:
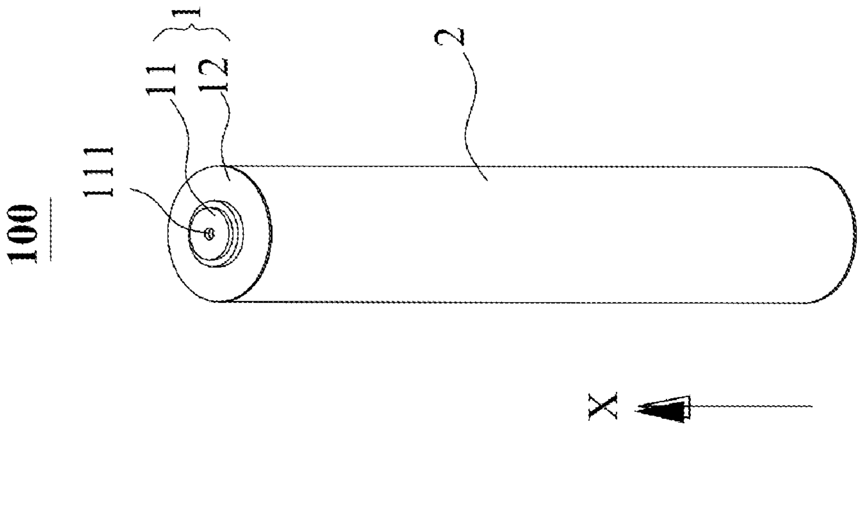
FIG. 3 is a schematic structural diagram of a battery cell according to some embodiments of the present application.

FIG. 3 is a schematic structural diagram of a battery cell 100 according to some embodiments of the present application.

As shown in FIG. 3, the battery cell 100 includes an end cap assembly 1, a housing 2, an electrode assembly arranged in the housing 2, and an electrolyte filled into the battery cell 100 (the electrode assembly and the electrolyte are not shown in the figures below in the accompanying drawings of each embodiment in order to clearly show main invention points of the present application). The end cap assembly 1 is connected to the housing 2, and the electrode assembly is enclosed in the housing 2. The end cap assembly 1 includes an end cap 12 and an electrode terminal 11 arranged on the end cap 12, wherein the electrode assembly is electrically connected to the electrode terminal 11. The end cap 12 covers an opening of the housing 2, so as to provide an enclosed space for the electrode assembly and the electrolyte. The housing 2 may have various shapes such as a cylinder and a cuboid. The shape of the housing 2 may be determined depending on the specific shape of the electrode assembly. For example, if the electrode assembly is of a cylinder structure, the cylinder structure may be selected for the housing 2; and if the electrode assembly is of a cuboid structure, the cuboid structure may be selected for the housing 2. It may be understood that the housing 2 may have a different shape from the electrode assembly.

As an example, in FIG. 3, the housing 2 is of a cylinder structure having two open ends, the two open ends are covered with the end cap assemblies 1 respectively, the end cap assemblies 1 on two sides each are provided with the electrode terminals 11, and the electrode terminals 11 on the two sides have opposite polarities. The housing 2 may be made of various materials, such as plastic, copper, iron, aluminum, stainless steel and an aluminum alloy, which is not specifically limited in the embodiment of the present application.

When the battery cell 100 is assembled, the electrode assembly is placed in the housing 2, then the electrode assembly is electrically connected and fixed to the electrode terminal 11, and the end caps 12 on two sides are fixedly connected to the housing 2, so as to complete the assembly of the battery cell 100. After the assembly is completed, the electrolyte is filled into the battery cell 100.

In a particular embodiment, the present application provides a battery. The battery includes at least two battery cells 100, wherein each of the battery cells 100 includes electrode terminals 11 arranged on end portions of two sides of the battery cell 100 in a lengthwise direction X, the electrode terminal 11 on one side of the battery cell 100 is provided with a filling port 111 for filling an electrolyte in the lengthwise direction X of the battery cell, and the electrode terminals 11 of the two battery cells 100 that have the filling ports 111 are oppositely arranged in the lengthwise direction X and are welded together, so as to seal the filling port 111.

Figure 4:
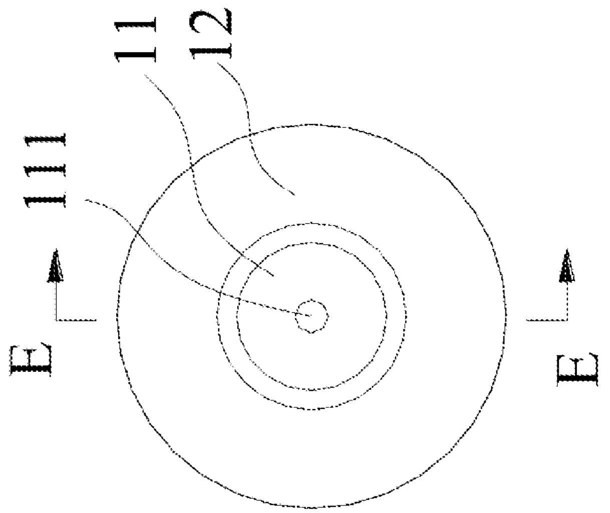
FIG. 4 is a top view of the battery cell of FIG. 3.
Figure 5:
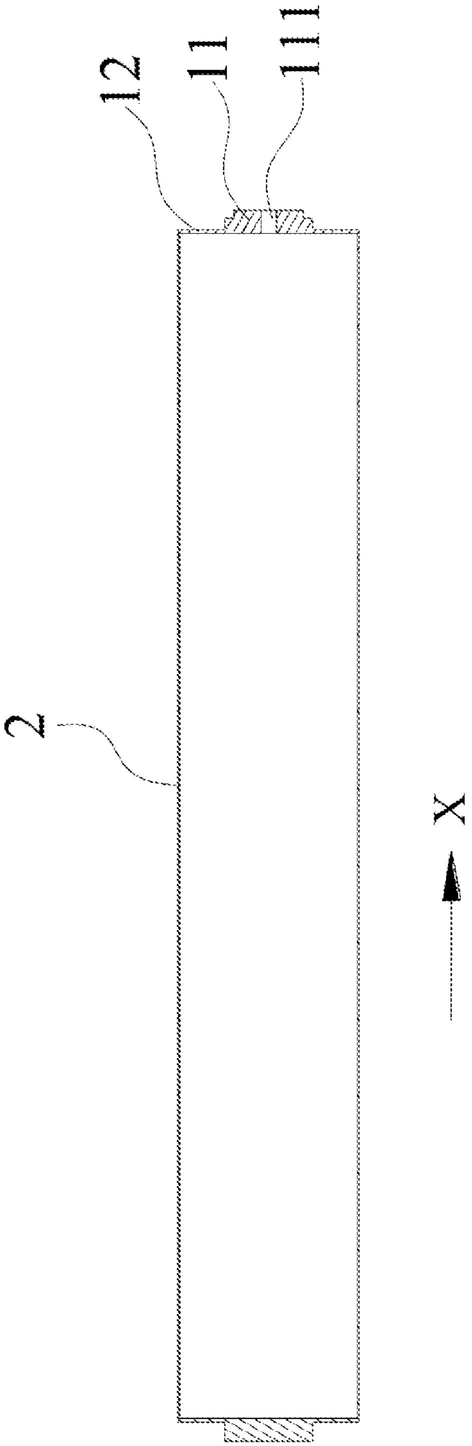
FIG. 5 is a sectional view of the embodiment of FIG. 4 taken along line E-E.

FIG. 4 is a top view of the battery cell 100 of FIG. 3; and FIG. 5 is a sectional view of the embodiment of FIG. 4 taken along line E-E.

As shown in FIGS. 4 and 5, the electrode terminal 11 is arranged on the end cap 12, and the filling port 111 is provided in the electrode terminal 11. The filling port 111 is a through hole penetrating the electrode terminal 11, and after the battery cell 100 is assembled, the electrolyte is filled into the battery cell 100 through the filling port 111.

The filling port 111 is provided in the electrode terminal 11, and the filling port 111 does not occupy a space of the end cap 12, such that the size of the electrode terminal 11 may be increased, thereby increasing the overcurrent area of the electrode terminal 11.

Figure 6:
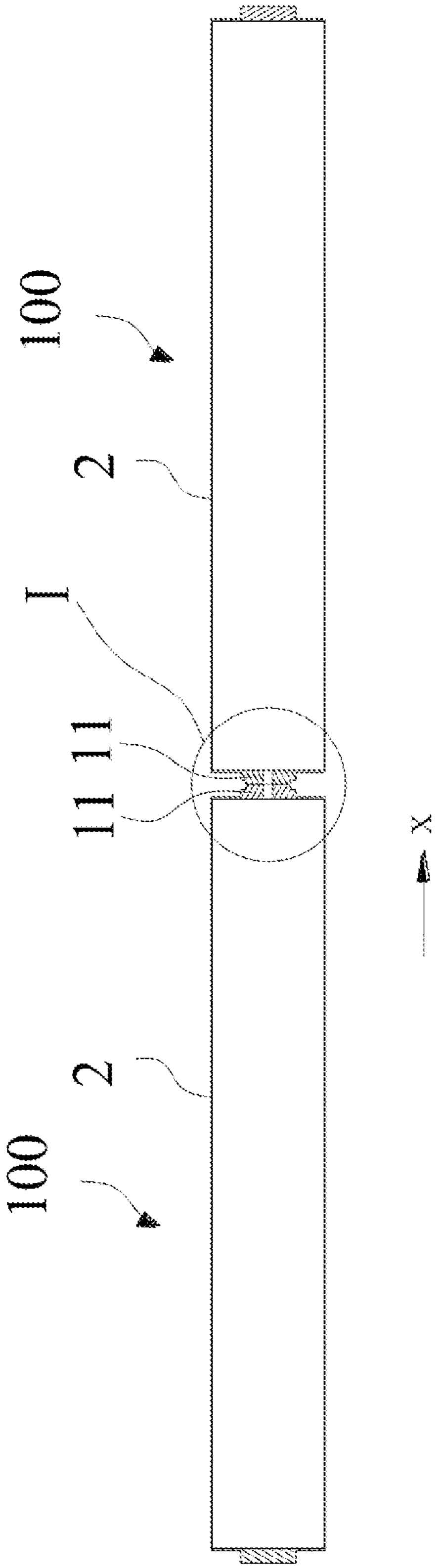
FIG. 6 is a sectional view of a battery according to an embodiment of the present application.

FIG. 6 is a sectional view of the battery B according to an embodiment of the present application.

As shown in FIG. 6, after a certain amount of electrolyte is filled into battery cells 100 through filling ports 111, electrode terminals 11 of the two battery cells 100 that have the filling ports 111 are oppositely arranged in the lengthwise direction X of the battery cells and are welded together to form the battery B.

In this embodiment, the electrode terminals 11 of the two battery cells 100 that have the filling ports 111 have the same polarity, and after the two electrode terminals 11 are oppositely arranged and welded together, the two battery cells 100 are connected in parallel to form the battery B. The polarities of the two oppositely arranged and welded electrode terminals 11 may also be configured to be opposite, in order to connect the two battery cells 100 in series to form the battery B.

After the filling of electrolyte into the battery cell 100 is completed through the filling port 111, it is necessary to seal the filling port 111 to ensure the overall sealing performance of the battery cell 100. In the prior art, in order to seal the filling port 111, after an electrolyte filling procedure is completed, it is necessary to mount a sealing pin in the filling port 111, and the sealing pin is welded in the filling port 111 by means of laser welding to seal the filling port 111. Before the sealing pin is welded, in order to prevent the sealing pin placed in the filling port 111 from falling into the battery cell 100, a step structure is required to be provided inside the filling port 111 to position the sealing pin. Sealing the filling port 111 by means of the sealing pin complicates the machining of the filling port 111 and additionally provides a procedure of fixing the sealing pin.

In the embodiment of the present application, the filling ports 111 are provided in the electrode terminals 11, the two electrode terminals 11 having the filling ports 111 are oppositely arranged and welded together, the entire battery B is sealed directly by means of the electrode terminals 11, and no additional sealing procedure is needed, thereby improving the production efficiency and reducing the cost. Moreover, by welding the electrode terminals 11 of the two battery cells 100 that have the filling ports 111, no sealing pin is required for welding and sealing, so it is unnecessary to process a step structure to place the sealing pin 111, thereby reducing the work for machining the filling ports 111. Moreover, since the procedure for laser welding of the sealing pin is eliminated, the cross-sectional shape of the filling port 111 is not limited to a circular shape any more, and may be a variety of shapes suitable for a variety of situations, such as square, polygonal, and irregular, and the circular shape is not excluded. Various options are provided for a structural form of the filling port 111; and the machining requirements for the shape of the filling port are reduced, and it is not required to process a strictly circular filling port.

Figure 7:
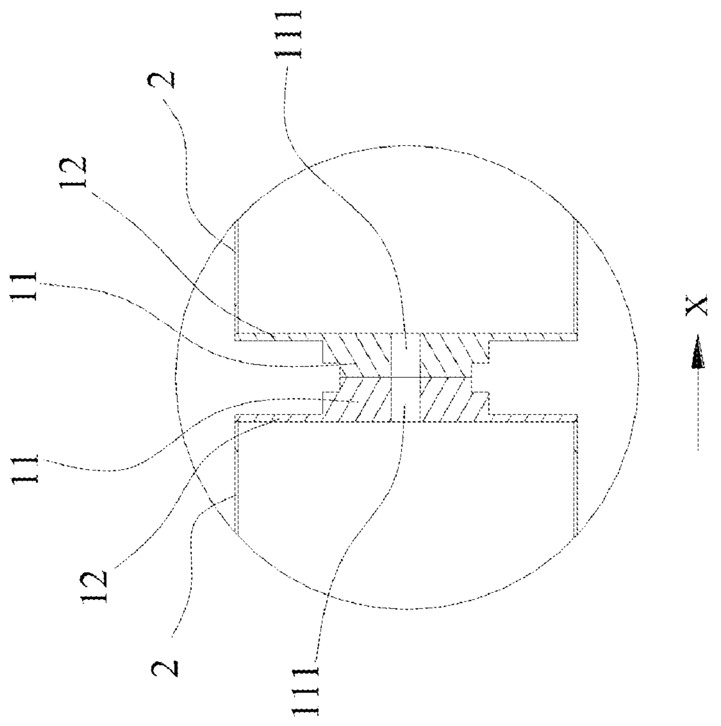
FIG. 7 is an enlarged view of part I in FIG. 6.

FIG. 7 is an enlarged view of part I in FIG. 6.

As shown in FIG. 7, in some embodiments, the filling port 111 is located in the center of the electrode terminal 11 to facilitate communication between the filling ports 111 of the two battery cells 100.

The provision of the filling ports 111 in the center of the electrode terminals 11 allows the influence of the welding of the electrode terminals 11 on the filling ports 111 to be avoided, and facilitates the communication between two filling ports 111 when the two electrode terminals 11 abut against each other for supplement and balance of the electrolyte between the two battery cells 100.

Figure 8:
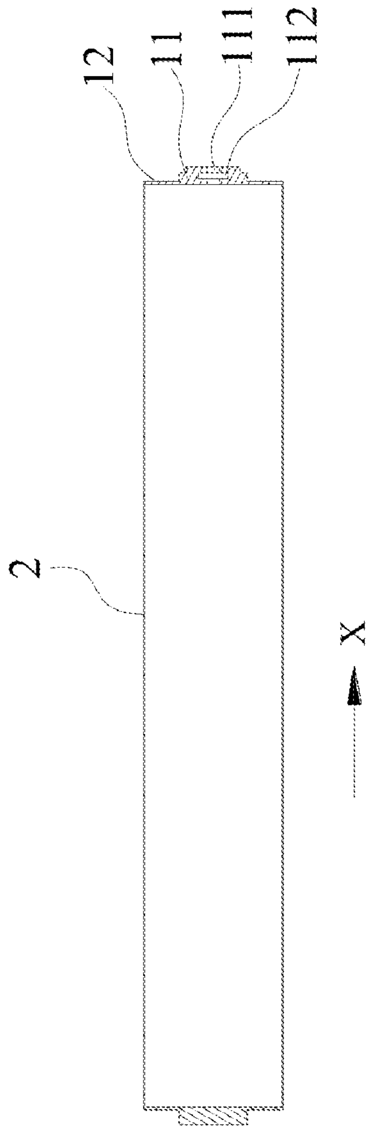
FIG. 8 is a sectional view of another embodiment of FIG. 4 taken along line E-E.

FIG. 8 is a sectional view of another embodiment of FIG. 4 taken along line E-E.

As shown in FIG. 8, in another embodiment, the electrode terminal 11 of the battery cell 100 is arranged on the end cap 12, and the filling port 111 is provided in the electrode terminal 11. The filling port 111 is a through hole penetrating the electrode terminal 11. A groove 112 is further provided on a side surface of the electrode terminal 11 that has the filling port 111, and the groove 112 has a size greater than that of the filling port 111 in a direction perpendicular to the lengthwise direction X of the battery cell.

Figure 9:
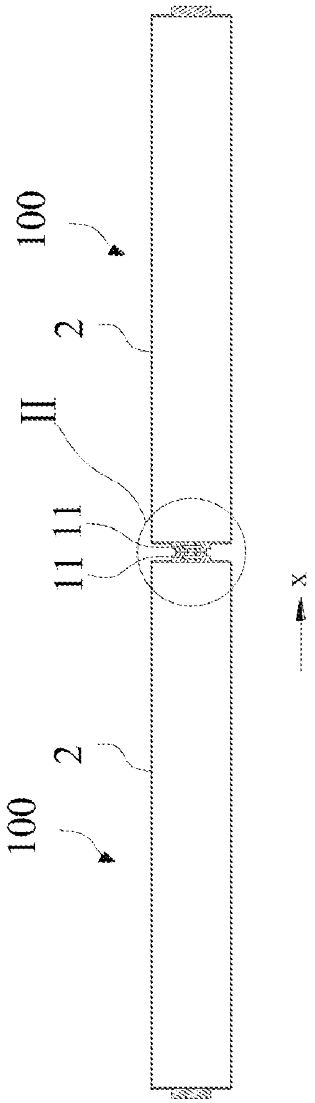
FIG. 9 is a sectional view of a battery according to another embodiment of the present application.
Figure 10:
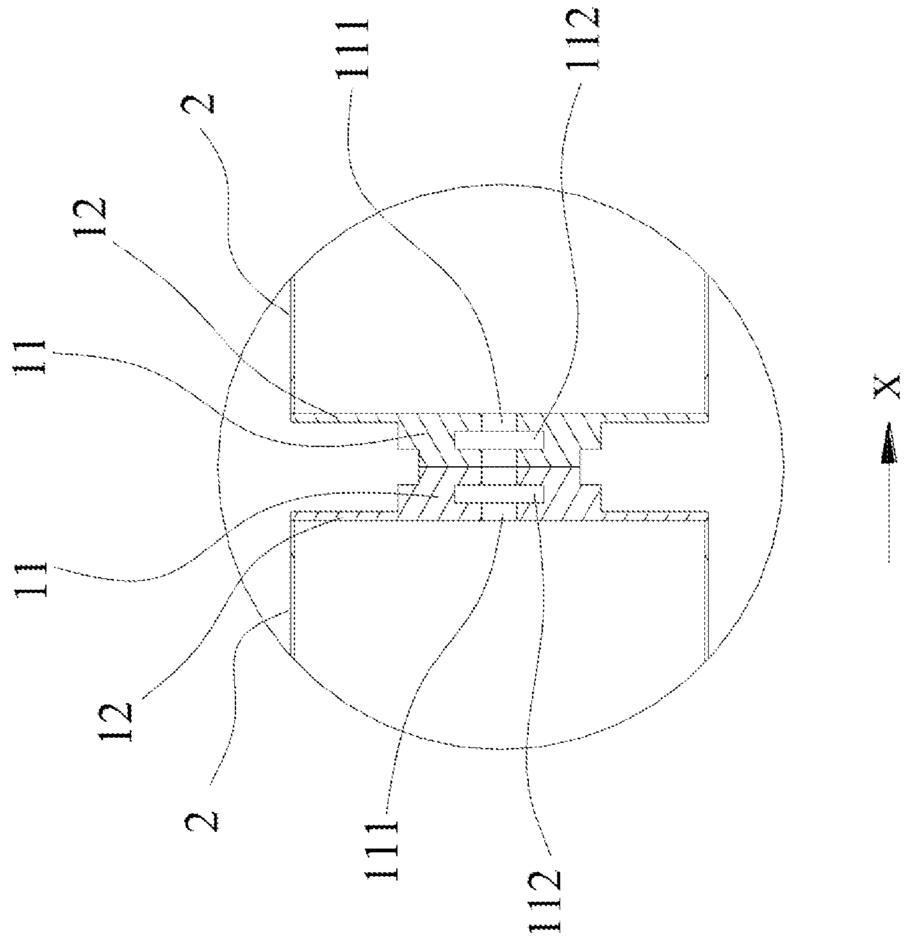
FIG. 10 is an enlarged view of part II in FIG. 9.

FIG. 9 is a sectional view of the battery B according to another embodiment of the present application; and FIG. 10 is an enlarged view of part II in FIG. 9.

As shown in FIGS. 9 and 10, after a certain amount of electrolyte is filled into the battery cells 100 through the filling ports 111, the electrode terminals 11 of the two battery cells 100 that have the filling ports 111 are oppositely arranged in the lengthwise direction X of the battery cells and are welded together to form the battery B.

When the electrode terminals 11 of the two battery cells 100 are welded together, the battery cells 100 are required to be horizontally placed. Since the filling ports 111 have not been sealed, the electrolyte in the battery cells 100 has the risk of flowing out through the filling ports 111 when the battery cells 100 are horizontally placed.

As shown in FIG. 10, a groove 112 is provided on an inner side surface of each of the filling ports 111, and after the battery cells 100 are horizontally placed, the electrolyte is first accumulated in the grooves 112 when flowing out of the battery cells 100. When the two electrode terminals 11 having the filling ports 111 are welded together, thanks to the buffer storage of the electrolyte in the groove 112, the risk of the electrolyte flowing out through the filling ports 111 is reduced during welding, and the influence of the flowed-out electrolyte on the quality of a weld joint is avoided.

Figure 11:
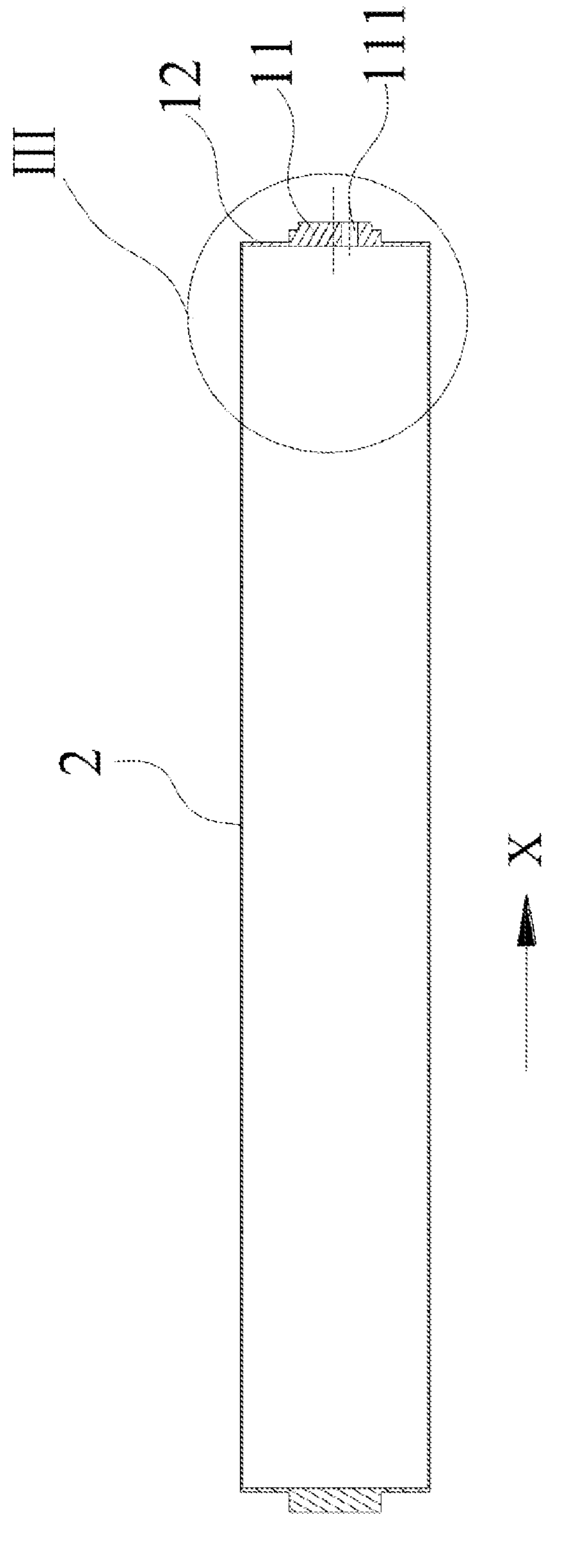
FIG. 11 is a sectional view of yet another embodiment of FIG. 4 taken along line E-E.
Figure 12:
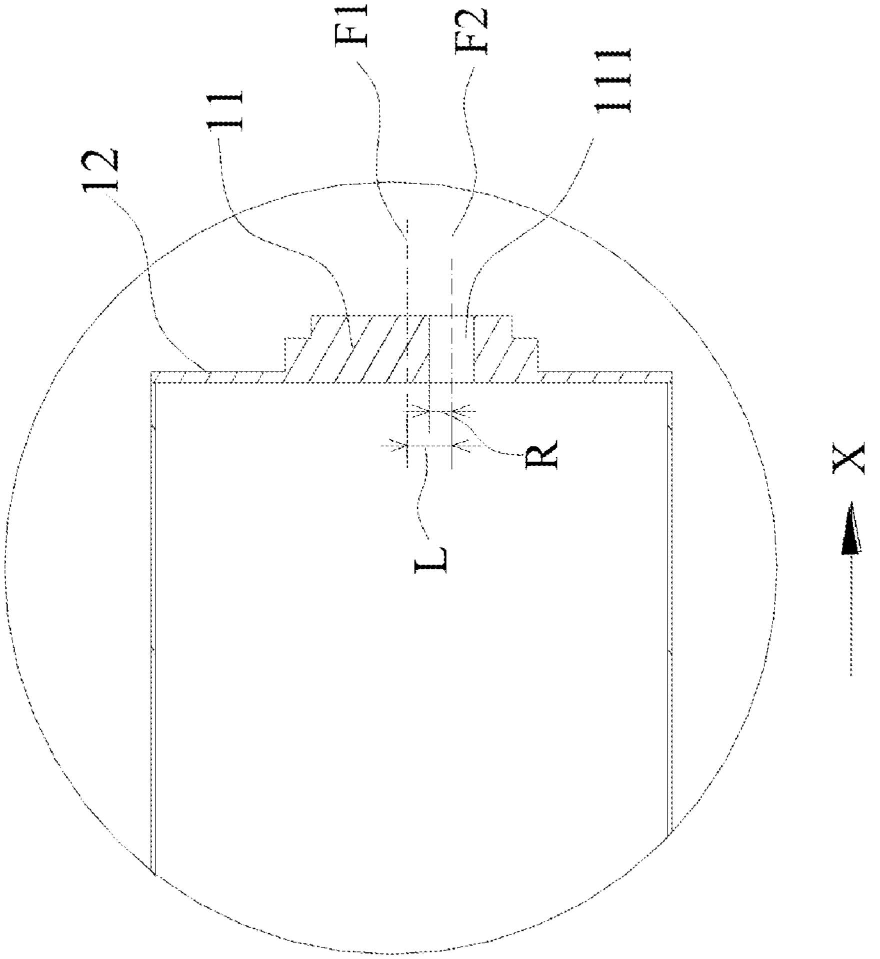
FIG. 12 is an enlarged view of part III of an embodiment of FIG. 11.

FIG. 11 is a sectional view of yet another embodiment of FIG. 4 taken along line E-E; FIG. 12 is an enlarged view of part III of an embodiment of FIG. 11.

As shown in FIGS. 11 and 12, in further embodiments, the filling ports 111 are provided offset from the center of electrode terminals 11, so as to arrange the filling ports 111 of two battery cells 100 in a staggered manner.

As shown in FIG. 12, a center line F2 of the filling port 111 is offset from a center line F1 of the electrode terminal 11 by a distance L. In a particular embodiment, the distance L is greater than a maximum distance R between an inner surface of the filling port 111 and the center line F2 of the filling port 111.

Figure 13:
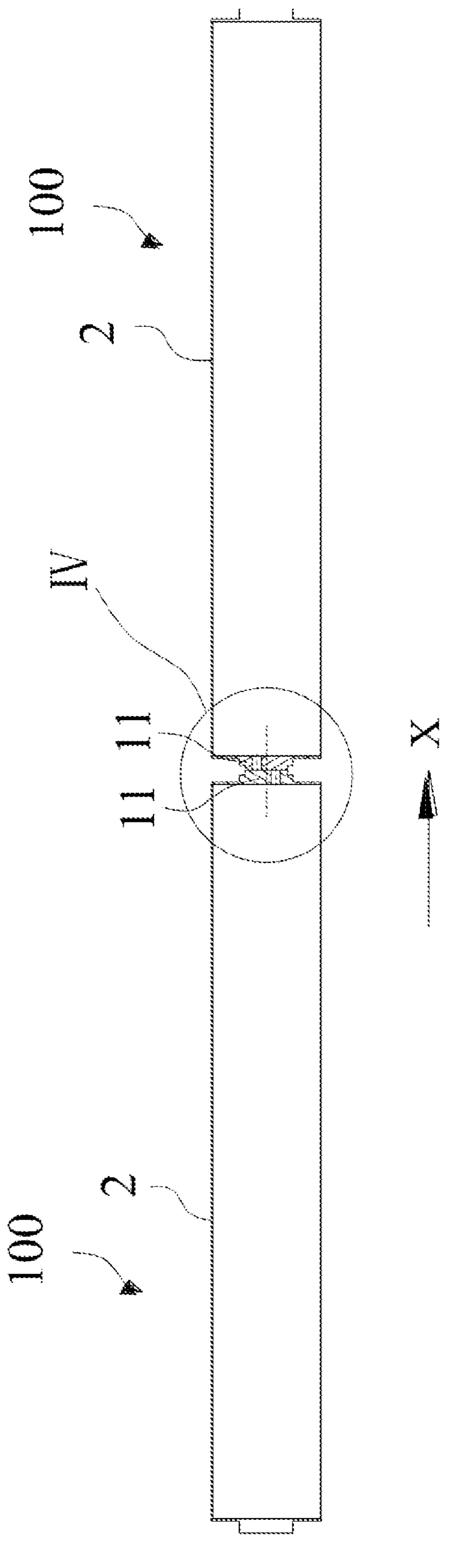
FIG. 13 is a top view of a battery according to yet another embodiment of the present application.
Figure 14:
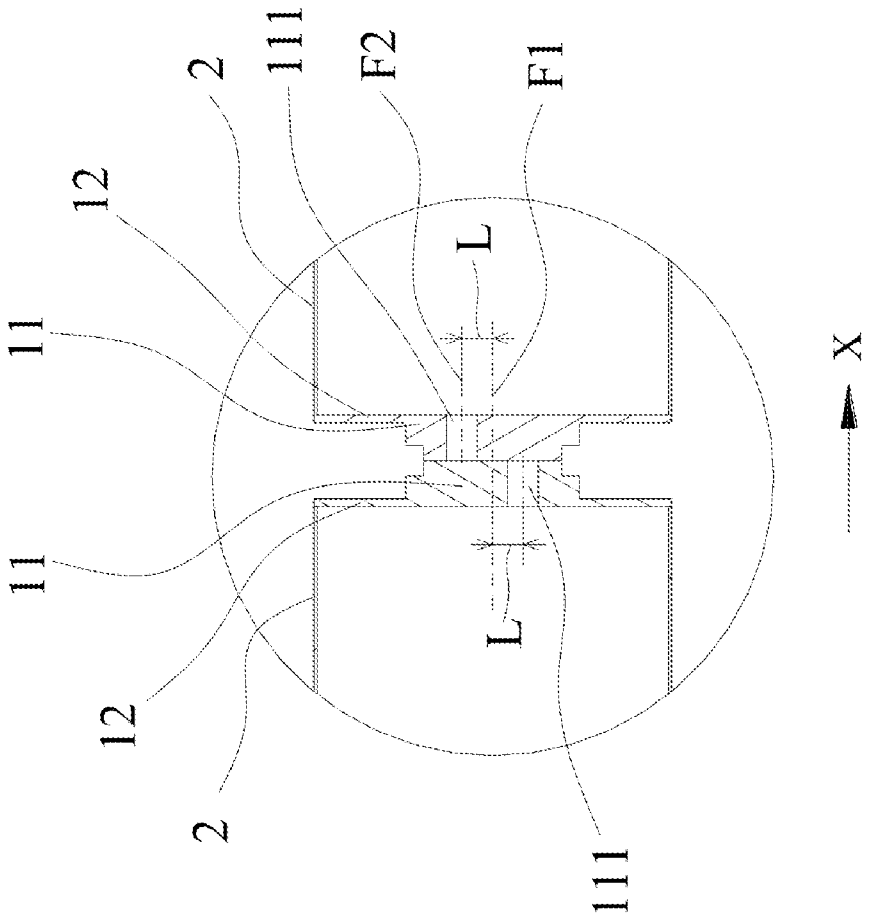
FIG. 14 is an enlarged view of part IV of an embodiment of FIG. 13.

FIG. 13 is a sectional view of the battery B according to yet another embodiment of the present application, and FIG. 14 is an enlarged view of part IV of an embodiment of FIG. 13.

As shown in FIGS. 13 and 14, in this embodiment, after a certain amount of electrolyte is filled into the battery cells 100 through the filling ports 111, the electrode terminals 11 of the two battery cells 100 that have the filling ports 111 are oppositely arranged in the lengthwise direction X of the battery cells and are welded together to form the battery B. When the two electrode terminals 11 are oppositely arranged, the two filling ports 111 are arranged in a staggered manner, that is, the two filling ports 111 are not located on the same straight line in the lengthwise direction X of the battery cells.

As shown in FIG. 14, the filling ports 111 of the two battery cells 100 are arranged in a staggered manner, since the distance L by which the center line F2 of the filling ports 111 is offset from the center line F1 of the electrode terminals 11 is greater than the maximum distance R of the filling ports 111, in this case, when the two filling ports 111 are arranged in a staggered manner, the two filling ports 111 may be completely staggered without communication therebetween, and after the two electrode terminals 11 are welded together, one filling port 111 may be blocked by a portion of the other electrode terminal 11 that has no filling port 111, such that the electrolyte in the two battery cells 100 is prevented from circulating between the battery cells during use.

The filling ports 111 of the two battery cells 100 shown in FIG. 14 are staggered at an angle of 180 degrees, that is, the center lines of the two filling ports 111 and the center lines of the electrode terminals 11 are located in the same plane. The present application is not limited to a staggering angle of 180 degrees, and when the two electrode terminals 11 are oppositely arranged, it is only needed to ensure that two filling ports 111 are completely stagger without communication, such that the electrolyte in the two battery cells 100 may not circulate between the battery cells. When the two electrode terminals 11 abutting against each other are two electrodes having opposite polarities, it is advantageous if the filling ports 111 are designed not to communicate with each other.

Figure 15:
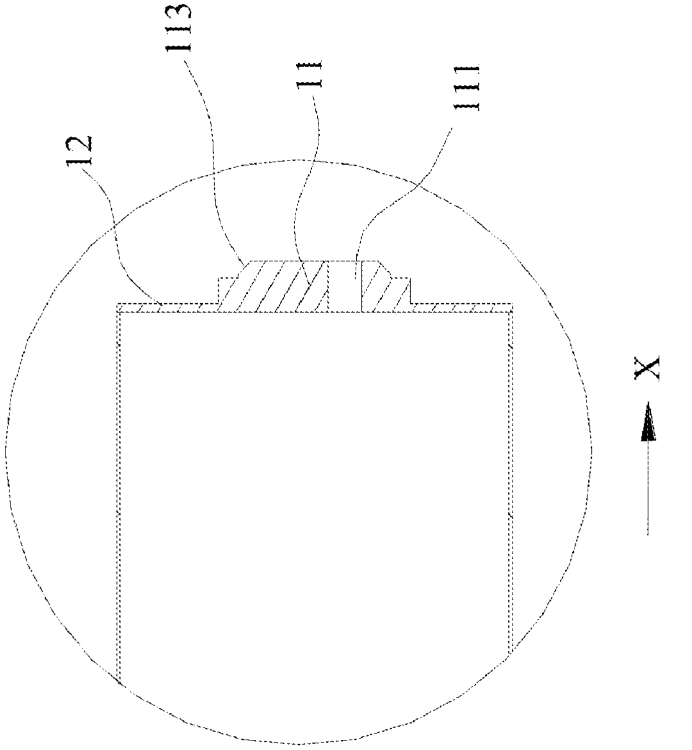
FIG. 15 is an enlarged view of a portion III of another embodiment of FIG. 11.

FIG. 15 is an enlarged view of part III of another embodiment of FIG. 11.

As shown in FIG. 15, in another embodiment, the electrode terminal 11 is provided with a step portion 113 along the periphery of an end portion of the battery cell in the lengthwise direction X. The step portion 113 is annularly arranged along the end portion of the electrode terminal 11 to from a partial notch at the periphery of the end portion of the electrode terminal 11. The step portion 113 in FIG. 15 is an annularly-arranged bevelled chamfer, and the cross-sectional shape of the step portion 113 may be another shape capable of forming a notch, such as a square shape, a trapezoid shape, and a circular arc shape.

Figure 16:
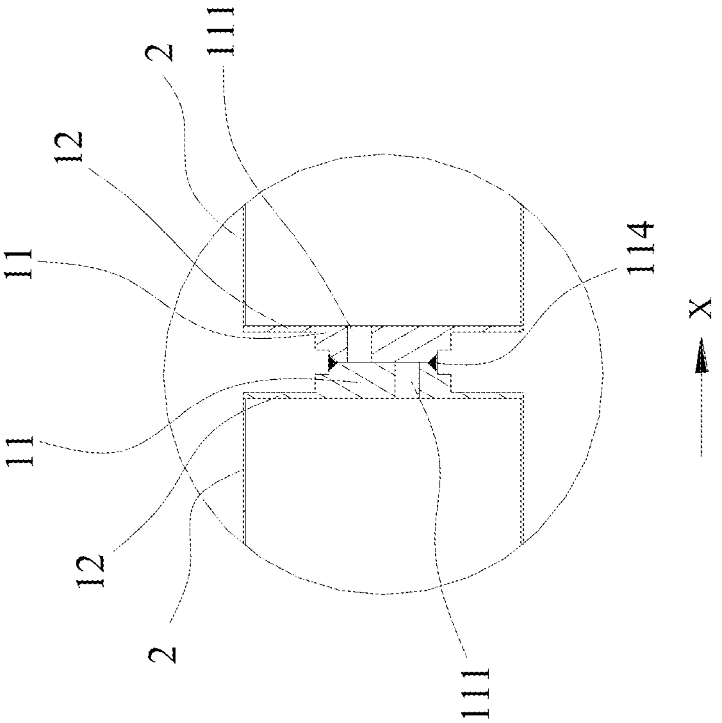
FIG. 16 is a partial enlarged sectional view of the welded connection of two battery cells of FIG. 15.

FIG. 16 is a partial enlarged sectional view of the welded connection of two battery cells 100 of FIG. 15.

As shown in FIG. 16, when electrode terminals 11 of two battery cells 100 of this embodiment are oppositely arranged and welded together, since partial notches are provided by the step portions 113 on the end portions of the electrode terminals 11, a welding groove 114 is formed after the two step portions 113 are oppositely arranged and the two notches correspond to each other.

The two electrode terminals 11 are welded at the welding groove 114, and during welding, reflections of welding laser are concentrated in the welding groove 114, thereby improving the welding quality, reducing the influences of laser welding on the end cap of the battery, enhancing the sealing performance of the battery B, and improving the yield of finished battery products.

In some embodiments, the filling port 111 has a circular, square, triangular, or polygonal cross section. When a conventional filling port 111 is sealed by means of a sealing pin, laser welding is needed, and due to the path limitation of laser welding, the filling port 111 may only be made into a circular shape. In the present application, the filling ports 111 are provided in the electrode terminals 11, the electrode terminals 11 of the two battery cells 100 are welded together, and no additional sealing pin is required for welding and sealing the filling ports 111. Therefore, the filling ports 111 may be made into other shapes such as square shape, triangle shape and polygonal shape, is not limited by the path of laser welding, and is not limited to a circular shape, such that the filling ports 111 may be shaped more flexibly.

In the above various embodiments, while opposite arrangement and welded connection of two battery cells 100 are described, a plurality of battery cells 100 may be welded as one piece. Welded connection of three battery cells 100 will be described as an example in the embodiments below.

Figure 17:
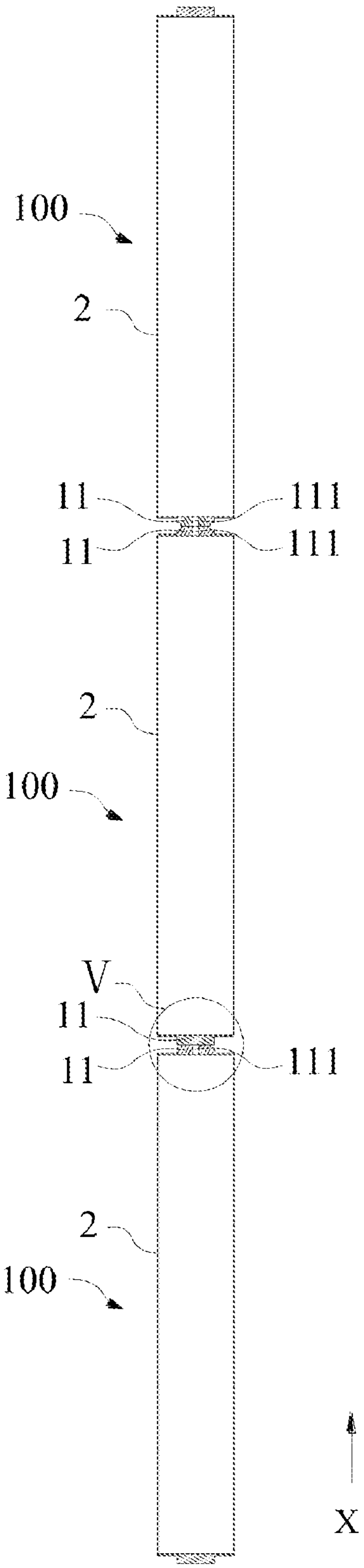
FIG. 17 is a sectional view of a battery according to still yet another embodiment of the present application.

FIG. 17 is a sectional view of the battery B according to another embodiment of the present application.

As shown in FIG. 17, three battery cells 100 are welded as one piece to form the battery B. Electrode terminals 11 of two of the battery cells 100 that have filling ports 111 are oppositely arranged and welded together to connect the two battery cells 100 in parallel, and the electrode terminals 11 of the two battery cells 100 are welded in the same manner as the embodiment shown in FIG. 7. The filling port 111 may have the same structural form as that of FIG. 10 or 14, or have a combination of different structural forms.

Figure 18:
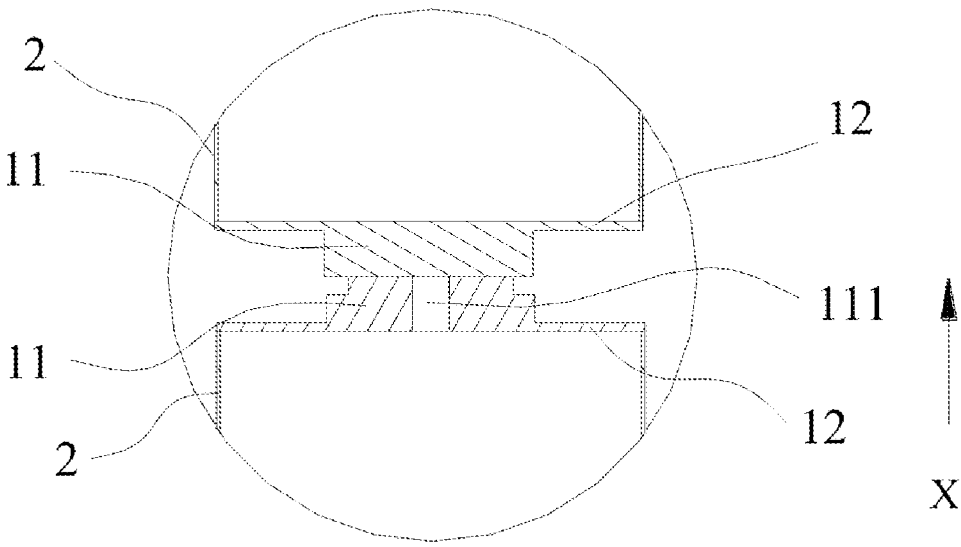
FIG. 18 is an enlarged view of part V in FIG. 17.

FIG. 18 is an enlarged view of part V in FIG. 17.

As shown in FIG. 18, the electrode terminal of the other battery cell 100 that has the filling port 111 is welded to the electrode terminal 11 having no filling port 111 at an end portion of one battery cell 100 of the two battery cells 100 which are welded, and the polarity of the electrode terminal 11 having no filling port 111 is opposite that of the electrode terminal 11 having the filling port, so as to connect the two battery cells 100 in series. In FIG. 18, the electrode terminal 11 having no filling port 111 is of a solid structure, which may seal the filling port 111 of the electrode terminal 11 welded to the electrode terminal.

The present application is not limited to welded connection of two battery cells 100 or welded connection of three battery cells 100 to form the battery B in the above embodiments, and a plurality of battery cells 100 may be welded as one piece in the above connection manner to form the battery B including the plurality of battery cells 100.

In the above embodiments of the present application, the battery cells 100 may be cylindrical battery cells and/or the electrode terminals may be cylindrical electrode terminals. Of course, the present application is not limited thereto and may be adapted to other shapes of battery structures.

Moreover, the present application is not limited to the structure of the above embodiments, and may be a combination of the above embodiments.

Figure 19:
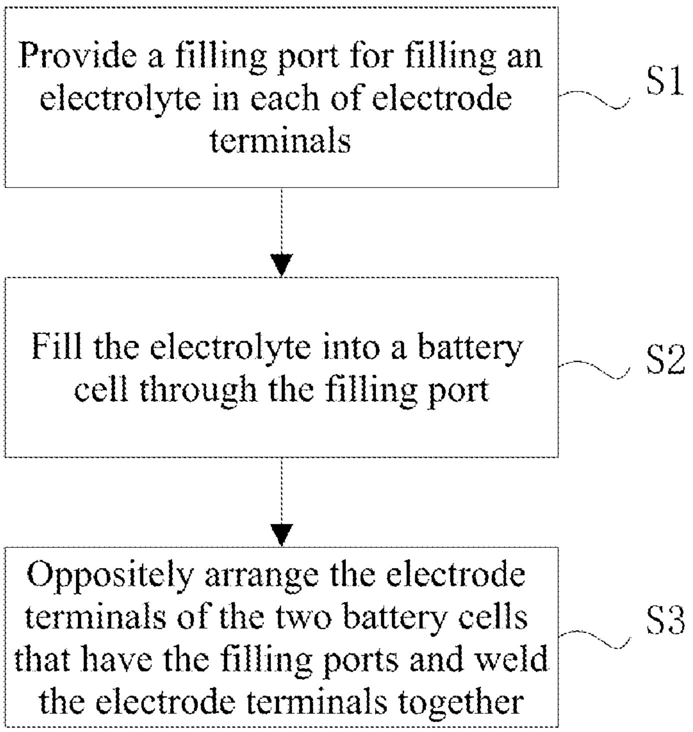
FIG. 19 is a flow chart of a method for manufacturing a battery according to an embodiment of the present application.

FIG. 19 is a flow chart of a method for manufacturing a battery according to an embodiment of the present application.

The present application further relates to a method for manufacturing a battery. The battery B includes at least two battery cells 100, wherein each of the battery cells 100 includes electrode terminals 11 arranged at end portions of two sides of the battery cell in the lengthwise direction X.

As shown in FIG. 19, the method for manufacturing a battery includes the following steps.

At step S1, a filling port 111 for filling an electrolyte is provided in the electrode terminal 11 on one side of the battery cell 100 in the lengthwise direction X of the battery cell.

At step S2, the electrolyte is filled into the battery cell 100 through the filling port 111.

At step S3, the electrode terminals 11 of the two battery cells 100 that have the filling ports 111 are oppositely arranged in the lengthwise direction X of the battery cells and are welded together.

According to the method for manufacturing a battery of the present application, the filling port 111 is provided in the electrode terminal 11, and the filling port 111 does not occupy a space of the end cap 12, such that the size of the electrode terminal 11 may be increased, thereby increasing the overcurrent area of the electrode terminal 11. The two electrode terminals 11 having the filling ports 111 are oppositely arranged and welded together. The entire battery B is sealed directly by means of the electrode terminals 11 without an additional sealing procedure, thereby reducing the cost and improving the production efficiency. Moreover, by welding the electrode terminals 11 of the two battery cells 100 that have the filling ports 111, no sealing pin is required for welding and sealing, so it is unnecessary to process a step structure to place the sealing pin 111, thereby reducing the work for machining the filling ports.

In some embodiments, the method for manufacturing a battery further includes the step of testing the battery for gas tightness. After the battery cell 100 is assembled, the electrolyte is filled and sealing is completed, a gas tightness test is required to ensure the sealing performance of the battery cell 100 and ensure the yield of the battery cell 100.

In the embodiments of the present application, after the battery cells 100 are assembled and the electrolyte is filled, the battery cell 100 is not additionally sealed, and the electrode terminals 11 of the battery cells 100 that have the filling ports 111 are oppositely arranged and welded together to form the battery B, thereby sealing the entire battery B. Therefore, a gas tightness test is required for the entire battery B.

In order to perform the gas tightness test on the battery B of the present application, before the electrode terminals 11 of the two battery cells 100 that have the filling ports 111 are oppositely arranged in the lengthwise direction X of the battery cells and are welded together, the method further includes the step of filling helium into the battery cells 100 through the filling ports 111.

After helium is filled into the battery cells 100, two electrode terminals 11 having the filling ports 111 are welded together to seal the entire battery B. After the welding is completed, the entire battery B is subjected to the gas tightness test to detect helium leakage from the battery B, and if no helium leakage, it is indicated that the entire battery B is well sealed.

According to the method for manufacturing a battery of the present application, helium is filled into the battery cells 100 through the filling ports 111, then the electrode terminals 11 of the two battery cells 100 are welded together, and it is unnecessary to additionally provide a gas tightness test hole and seal the test hole, thereby reducing battery manufacturing procedures and improving the production efficiency.

The present application relates to a power consuming device using the battery B as described above or as manufactured by the above method for manufacturing a battery.

The foregoing descriptions are merely preferred embodiments of the present application, but are not intended to limit the present application. For those skilled in the art, the present application may have various modifications and variations. Any modifications, equivalent substitutions, improvements, and the like made within the spirit and principle of the present application should be included within the scope of protection of the present application.

What is claimed is:

1. A battery, comprising at least two battery cells, wherein each of the at least two battery cells comprises two electrode terminals respectively arranged at two end portions of two sides of the battery cell in a lengthwise direction, wherein for each one of two adjacent battery cells of the at least two battery cells, a filling port for filling an electrolyte into the battery cell is provided in one of the two electrode terminals at one of two end portions in the lengthwise direction of the battery cell, and the two electrode terminals of the two adjacent battery cells that have the two respective filling ports are arranged in the lengthwise direction of the battery cells and are directly welded to each other such that a weld region seals the two respective filling ports.

2. The battery according to claim 1, wherein the two electrode terminals of the two adjacent battery cells that have the two respective filling ports are electrode terminals of a same polarity that are welded together to electrically connect the two adjacent battery cells in parallel.

3. The battery according to claim 1, wherein the two respective filling ports of the two adjacent battery cells are located in the center of the electrode terminals to communicate the two respective filling ports of the two adjacent battery cells.

4. The battery according to claim 3, wherein the communication between the two respective filling ports in the center of the corresponding electrode terminals of the two adjacent battery cells allows for supplement and balance of the electrolyte between the two adjacent battery cells.

5. The battery according to claim 1, wherein, for each one of the two adjacent battery cells, an electrolyte-receiving groove is further provided on a surface of the electrode terminal that has the filling port, a groove dimension in a direction perpendicular to the lengthwise direction is greater than a corresponding dimension of the filling port in the direction perpendicular to the lengthwise direction of the battery cell.

6. The battery according to claim 5, wherein, for each of the two adjacent battery cells, the electrolyte-receiving groove is provided on an inner side surface of the corresponding filling port, the electrolyte-receiving groove is configured to receive and store an electrolyte flowing out from the battery cell and accumulate the electrolyte in the electrolyte-receiving groove to prevent the electrolyte from flowing out through the filling port, after the battery cell is horizontally placed.

7. The battery according to claim 1, wherein each one of the two respective filling ports of the two adjacent battery cells is offset from a center of the corresponding electrode terminal that has the filling port, the two respective filling ports of the two adjacent battery cells are staggered and non-communicating with each other when the two electrode terminals having the two respective filling ports are welded together.

8. The battery according to claim 7, wherein, for each of the two adjacent battery cells, a center line F2 of the filling port is offset from a center line F1 of the corresponding electrode terminal by a distance L, the distance L is greater than a maximum distance R between an inner surface of the filling port and the center line F2 of the filling port.

9. The battery according to claim 7, wherein the two respective filling ports of the two electrode terminals that are welded are not located on the same straight line in the lengthwise direction of the two adjacent battery cells.

10. The battery according to claim 1, wherein, for each one of the two adjacent battery cells, a step portion is provided at a periphery of an end portion of the electrode terminal having the filling port in the lengthwise direction of the battery cell, and the step portions of the two adjacent battery cells are oppositely arranged to form a welding groove, each step portion is integrally formed with the corresponding electrode terminal of the respective battery cell.

11. The battery according to claim 10, wherein the step portion is annularly arranged along the end portion of the electrode terminal to form a partial notch at the periphery of the end portion of the electrode terminal.

12. The battery according to claim 1, wherein the filling port of each of the two adjacent battery cells has a circular, square, triangular or polygonal cross section.

13. The battery according to claim 1, wherein the at least two battery cells are cylindrical battery cells, and/or the electrode terminals are cylindrical electrode terminals.

14. A power consuming device, comprising the battery according to claim 1, the battery being configured for providing electric energy to the power consuming device.

15. The battery according to claim 1, wherein the two electrode terminals of the two adjacent battery cells that have the two respective filling ports are electrode terminals of different polarities that are welded together to electrically connect the two adjacent battery cells in series.

* * * * *